(12) United States Patent
Lin

(10) Patent No.: US 6,915,830 B2
(45) Date of Patent: Jul. 12, 2005

(54) HOT LAMINATING APPARATUS AND ELECTRIC CONTACT ENABLING DEVICE FOR USE IN SAME

(75) Inventor: Shin-Fu Lin, Taipei (TW)

(73) Assignee: Primax Electronics, Ltd., Taiwan (TW)

(*) Notice: Subject to any disclaimer, the term of this patent is extended or adjusted under 35 U.S.C. 154(b) by 7 days.

(21) Appl. No.: 10/648,701

(22) Filed: Aug. 26, 2003

(65) Prior Publication Data

US 2004/0137763 A1 Jul. 15, 2004

(30) Foreign Application Priority Data

Nov. 15, 2002 (TW) .......................... 91133532 A

(51) Int. Cl.[7] .............................................. B32B 31/00
(52) U.S. Cl. ....................... 156/555; 156/582; 156/583.1
(58) Field of Search ................................ 156/555, 580, 156/582, 683.1; 100/327, 328, 334; 219/244, 469; 439/123, 13; 492/46

(56) References Cited

U.S. PATENT DOCUMENTS 6,549,738 B2 * 4/2003 Otani et al. ................. 399/117
6,791,068 B2 * 9/2004 Lin ............................. 219/469

FOREIGN PATENT DOCUMENTS

CN          2511607 Y       9/2002

* cited by examiner

Primary Examiner—James Sells
(74) Attorney, Agent, or Firm—Madson & Metcalf

(57) ABSTRACT

A laminating apparatus includes a roller, an electro-heating shaft, a power transmitting and resilient member and a power transmitting and securing member. The roller is in contact with a thin film, moves through the thin film to heat and laminate the thin film to a sheet material. The electro-heating shaft is wrapped by the roller, transforms electric energy into thermal energy to heat the thin film, and drives rotation of the roller to move through the thin film. The power transmitting and resilient member is in contact with an axial end surface of the electro-heating shaft in an axial direction of the electro-heating shaft for transmitting electricity from a power source to the electro-heating shaft. The power transmitting and securing member is coupled to the electro-heating shaft for compressing the power transmitting and resilient member therebetween, thereby continuously transmitting the electricity from the power source to the electro-heating shaft via the power transmitting and securing member.

4 Claims, 10 Drawing Sheets

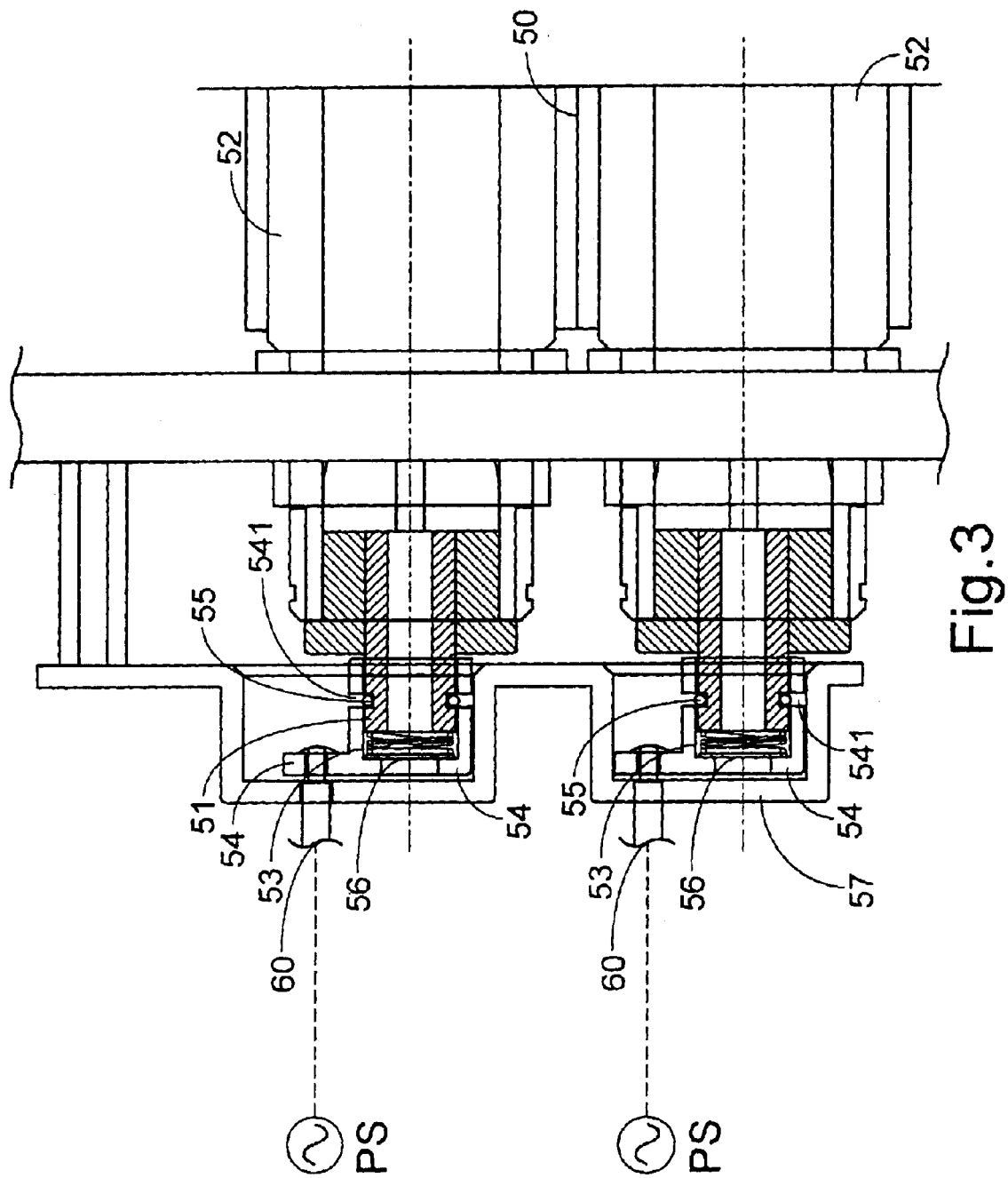

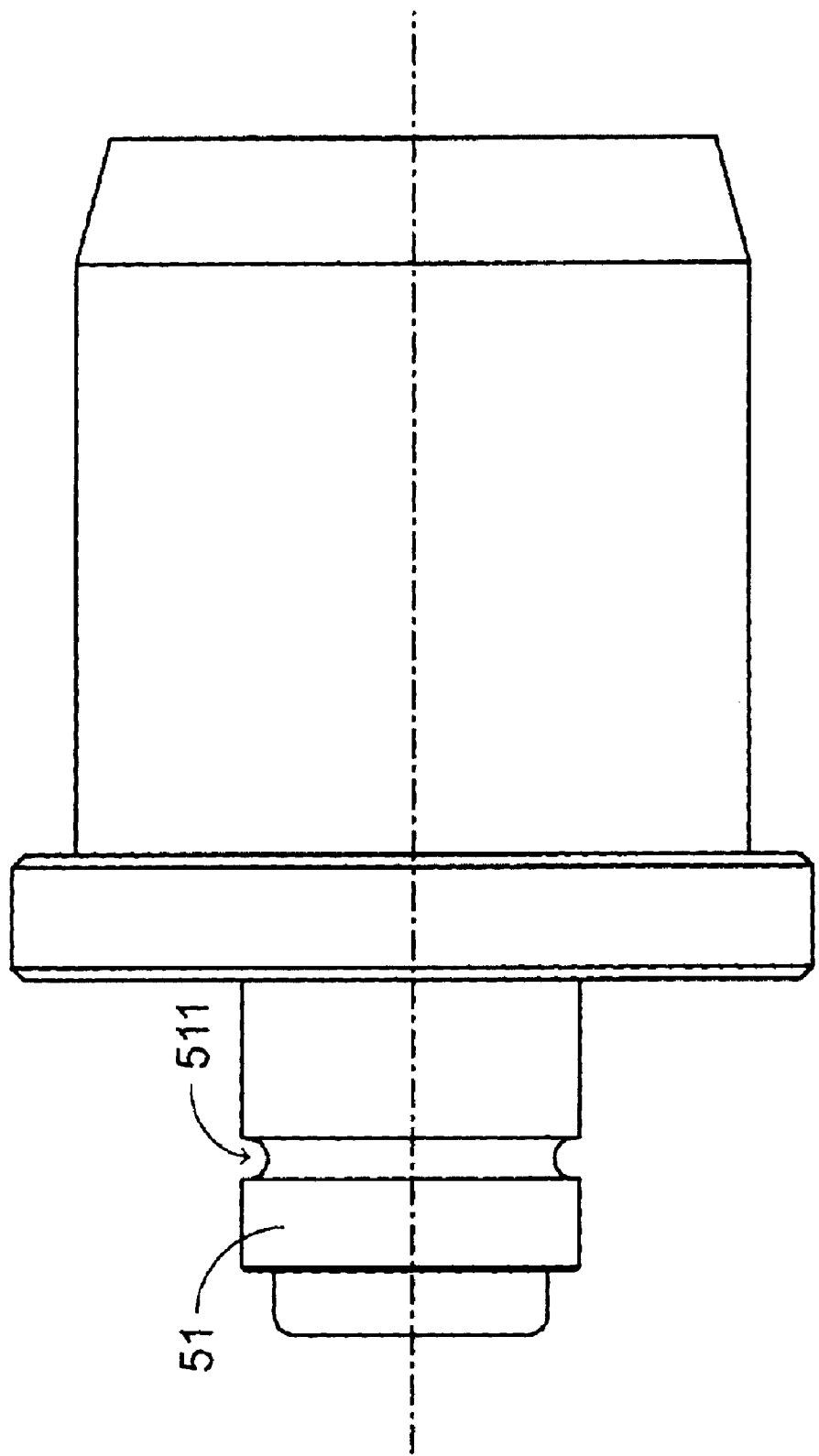

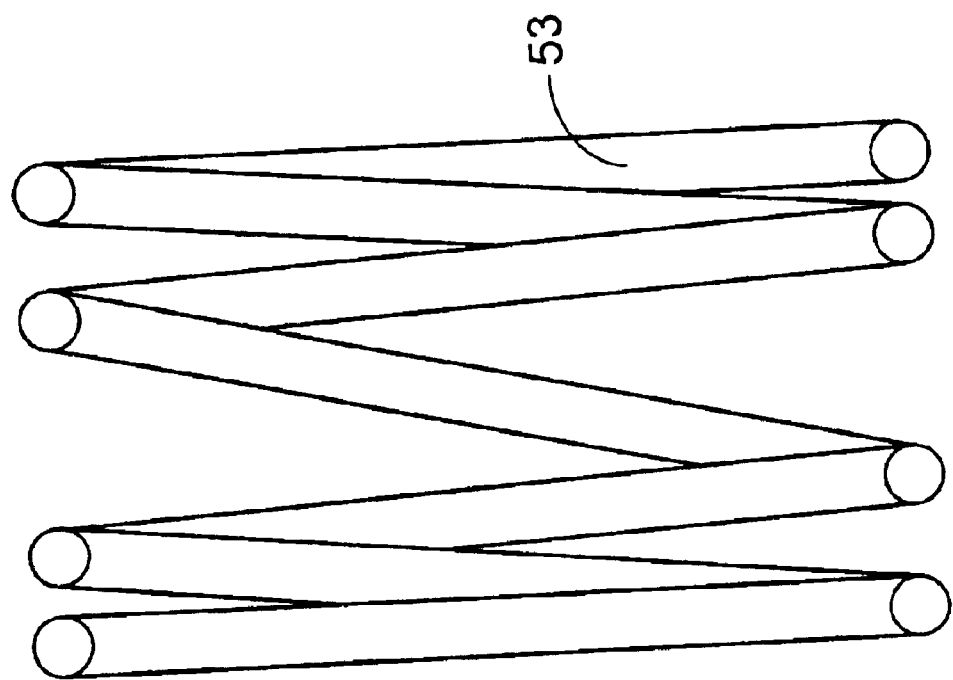

HOT LAMINATING APPARATUS AND ELECTRIC CONTACT ENABLING DEVICE FOR USE IN SAME

FIELD OF THE INVENTION

The present invention relates to a hot laminating apparatus, and more particularly to a hot laminating apparatus comprising a pair of rollers heated by rotating shafts. The present invention also relates to an electric contact enabling device for keeping electric contact of a rotating shaft with a power transmission member.

BACKGROUND OF THE INVENTION

Laminating apparatuses are widely used for laminating a sheet material such as paper between two pieces of plastic films. A conventional laminating apparatus shown in FIG. 1(a) principally comprises two pairs of rollers, i.e. front rollers 10 and rear rollers 11, and a heating unit 12. The front rollers 10 comprise an upper front roller 101 and a lower front roller 102, while the rear rollers 11 comprise an upper rear roller 111 and a lower rear roller 112. The heating unit 12 comprises an upper heating element 121 and a lower heating element 122. The heating unit produces heat from electricity. The process for laminating a sheet material by way of the laminating apparatus is illustrated as follows. The sheet material is sandwiched between a pair of plastic films. The sandwiched structure is then fed to the passage between the upper heating element 121 and the lower heating element 122 by means of the front rollers 10, and the plastic films are heated and thus softened. Then, the sandwiched structure advances and is pressed to laminate by means the rear rollers 11 so as to bond the sheet material with the plastic films.

In the above-mentioned laminating apparatus, since the heating mechanism and pressing mechanism are separately performed by two individual units, the materials of the sheet and the plastic films should be limited to some special combinations in view of the heating and laminating timings. In addition, the laminating effect of such laminating apparatus is sometimes not satisfied, for example, due to formation of some bubbles in the resulting article.

In order to overcome the drawbacks, another laminating apparatus as shown in FIG. 1(b) was developed. Such laminating apparatus, also referred as "hot shoe", comprises only a pair of rollers 22. The heat generated by heating plates 21 is uniformly distributed over aluminum extrusion elements 20, and radiated to heat up the rollers 22. Therefore, when the sheet material sandwiched between a pair of plastic films is fed through the rollers 22, the heating and pressing mechanisms are simultaneously performed thereon so as to avoid the problem of forming bubbles. Since heat for pressing the sandwiched structure is transferred to the rollers 22 through air gaps between the aluminum extrusion elements 20 and the rollers 22, a relatively long waiting time, for example 10–15 minutes, is required to warm up the laminating apparatus.

In order to reduce the warming-up period, another laminating apparatus as shown in FIG. 1(c) was developed. The laminating apparatus comprises a pair of heaters 30 and a pair of rollers 31. Each heater 30 is located inside one roller 31 to provide heat to the exterior surface of the roller 31. The rollers 31 with heaters 30 therein simultaneously perform the heating and pressing operations, and the rotation of the rollers 31 transmits the sheet material and the plastic films to move forwards. Since the heat is transferred from the heaters 30 to the outer surfaces of the rollers 31 in a manner of conduction other than radiation, relatively short time is enough to reach the working temperature for laminating the thin films. In addition, a compact size of the laminating apparatus can be obtained. Since the heaters 30 are rotated with the rollers 31, it is critical for the rotating heaters 30 to continuously receive power.

Please refer to FIG. 2. In a conventional method, the continuous power supply to a rotating heater 40 is assured of by arranging a copper resilient strip 41 by a conductive shaft 401 of the rotating heater 40. When the conductive shaft 401 rotates, the circumferential surface of the conductive shaft 401 is kept in contact with the still copper resilient strip 41. The rotation of the rollers 31 relative to the copper resilient strip 41, however, is likely to lead to serious abrasion of the conductive shaft 401 and even spark. Due to the considerations of safety and minimal abrasion, it is required to improve the electric contact means in order to continuously supply power to the rotating heaters.

SUMMARY OF THE INVENTION

It is an object of the present invention to provide a laminating apparatus with rearranged electric contacts between the shafts and the power transmission members to reduce abrasion upon the rotation of the conductive shaft.

In accordance with a first aspect of the present invention, there is provided a device for keeping electric connection of a rotating shaft to a power source. The device comprises a power transmitting and securing member, and a power transmitting and resilient member. The power transmitting and securing member is in electric connection to the power source and the rotating shaft for receiving electricity from the power source. The power transmitting and resilient member is compressed between an axial end surface of the rotating shaft and the power transmitting and securing member in an axial direction of the rotating shaft for continuously urging against and transmitting the electricity to the rotating shaft.

In one embodiment, the power transmitting and resilient member is a metallic spring. In another embodiment, the power transmitting and resilient member is a conductive rubber.

In one embodiment, the rotating shaft has a recess on a circumferential surface thereof for engaging with the power transmitting and securing member to confine the power transmitting and resilient member therebetween.

In one embodiment, the power transmitting and securing member comprises a shaft sheath and a clipping element. The shaft sheath is in electric connection with the power source, covers the axial end surface of the rotating shaft and has a slit aligned with the recess of the rotating shaft. The clipping element penetrates through the slit of the shaft sheath to engage with the rotating shaft at the recess so as to compress the power transmitting and resilient member between the shaft sheath and the axial end surface of the rotating shaft.

In one embodiment, the power transmitting and securing member further comprises a conductive liner interfacing between the shaft sheath and the axial end surface of the power transmitting and resilient member for protection from abrasion.

In one embodiment, the conductive liner is made of stainless steel, and the shaft sheath is made of copper coated with nickel.

In one embodiment, the shaft sheath is in electric connection to the power source via a conductive wire.

In accordance with a second aspect of the present invention, there is provided a laminating apparatus for laminating a sheet material to a thin film. The laminating apparatus comprises a roller, an electro-heating shaft, a power transmitting and resilient member and a power transmitting and securing member. The roller is in contact with the thin film, moves through the thin film to heat and laminate the thin film to the sheet material. The electro-heating shaft is wrapped by the roller, transforms electric energy into thermal energy transferred to the roller to heat the thin film, and drives rotation of the roller to move through the thin film. The power transmitting and resilient member is in contact with an axial end surface of the electro-heating shaft in an axial direction of the electro-heating shaft for transmitting electricity from a power source to the electro-heating shaft. The power transmitting and securing member is coupled to the electro-heating shaft for compressing the power transmitting and resilient member therebetween, thereby continuously transmitting the electricity from the power source to the electro-heating shaft via the power transmitting and securing member.

In accordance with a third aspect of the present invention, there is provided a laminating apparatus for laminating a sheet material between a pair of thin films. The laminating apparatus comprises a first and a second rollers, a first and a second electro-heating shafts, a first and a second shaft sheaths, and a first and a second power transmitting and resilient members. The first and the second rollers are configured to form therebetween a passage, through which the sheet material and the thin films are transmitted to be heated and pressed by the first and the second rollers. The first and the second electro-heating shafts are wrapped by the first and the second rollers, respectively, transform electric energy into thermal energy transferred to the first and a second rollers to heat the thin films, and drive rotation of the first and a second rollers to move through the thin films. The first and the second shaft sheaths cover the axial end surfaces of the first and the second electro-heating shafts and in electric connected with the first and the second electro-heating shafts, respectively. The first and the second power transmitting and resilient members are in contact with axial end surfaces of the first and the second electro-heating shafts in an axial direction of the first and the second electro-heating shafts for transmitting electricity from a power source to the first and the second electro-heating shafts, respectively.

In one embodiment, the first power transmitting and securing member further comprises a first conductive liner interfacing between the first electro-heating shaft and the axial end surface of the first power transmitting and resilient member, and the second power transmitting and securing member further comprises a second conductive liner interfacing between the second electro-heating shaft and the axial end surface of the second power transmitting and resilient member.

In one embodiment, each of the first and the second conductive liners is made of stainless steel, and each of the first and the second shaft sheaths is made of copper coated with nickel.

In one embodiment, each of the first and the second power transmitting and resilient members is a metallic spring.

In one embodiment, each of the first and the second power transmitting and securing members is a conductive rubber.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 3 is a cross-sectional view showing a laminating apparatus according to a preferred embodiment of the present invention;

FIG. 4(a) is an enlarged view showing one of the electro-heating shafts in FIG. 3;

FIG. 4(b) is an enlarged view of the metallic spring in FIG. 3;

DETAILED DESCRIPTION OF THE PREFERRED EMBODIMENT

Figure 1A:
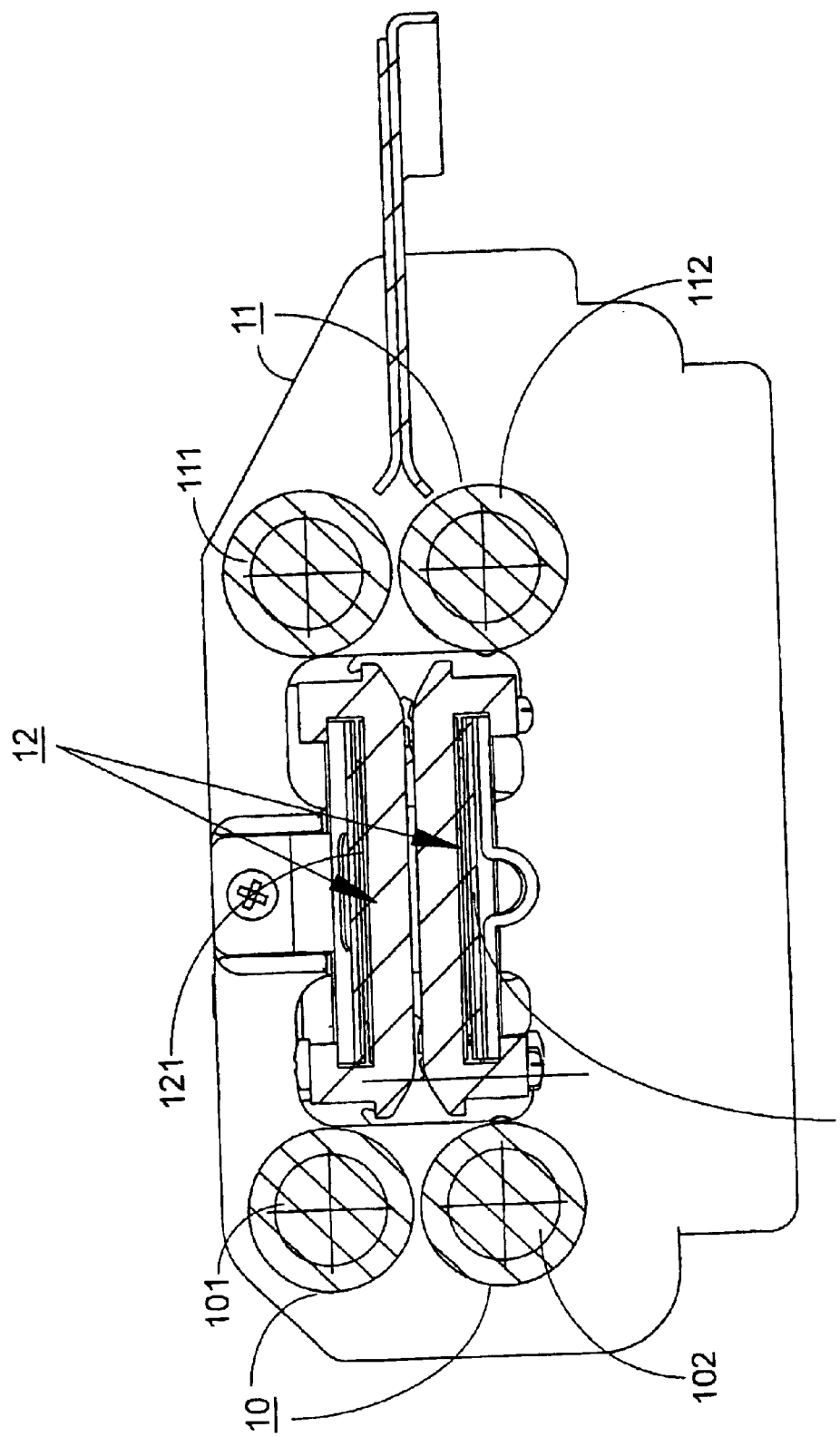
FIGS. 1(a)~1(c) are cross-sectional views showing three kinds of conventional laminating apparatus.
Figure 1B:
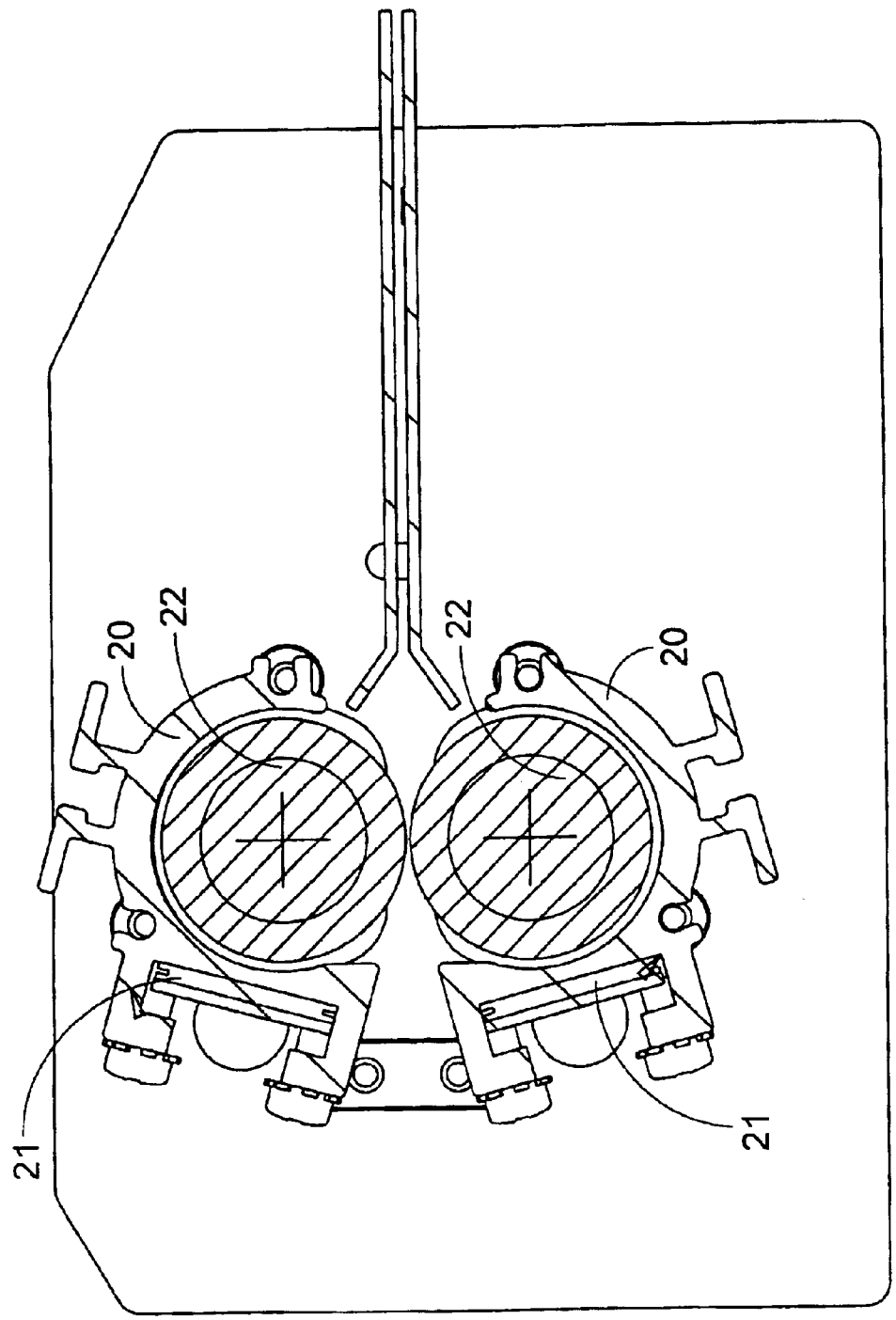
Figure 1C:
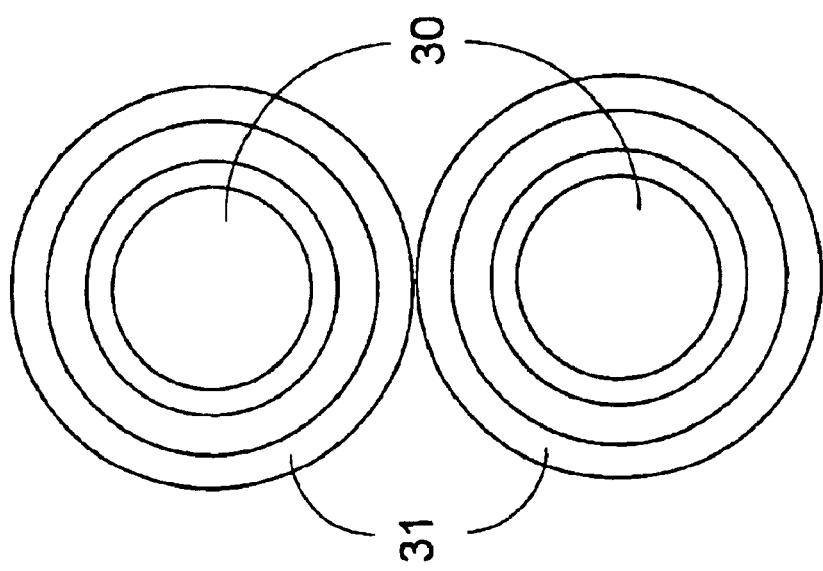
Figure 2:
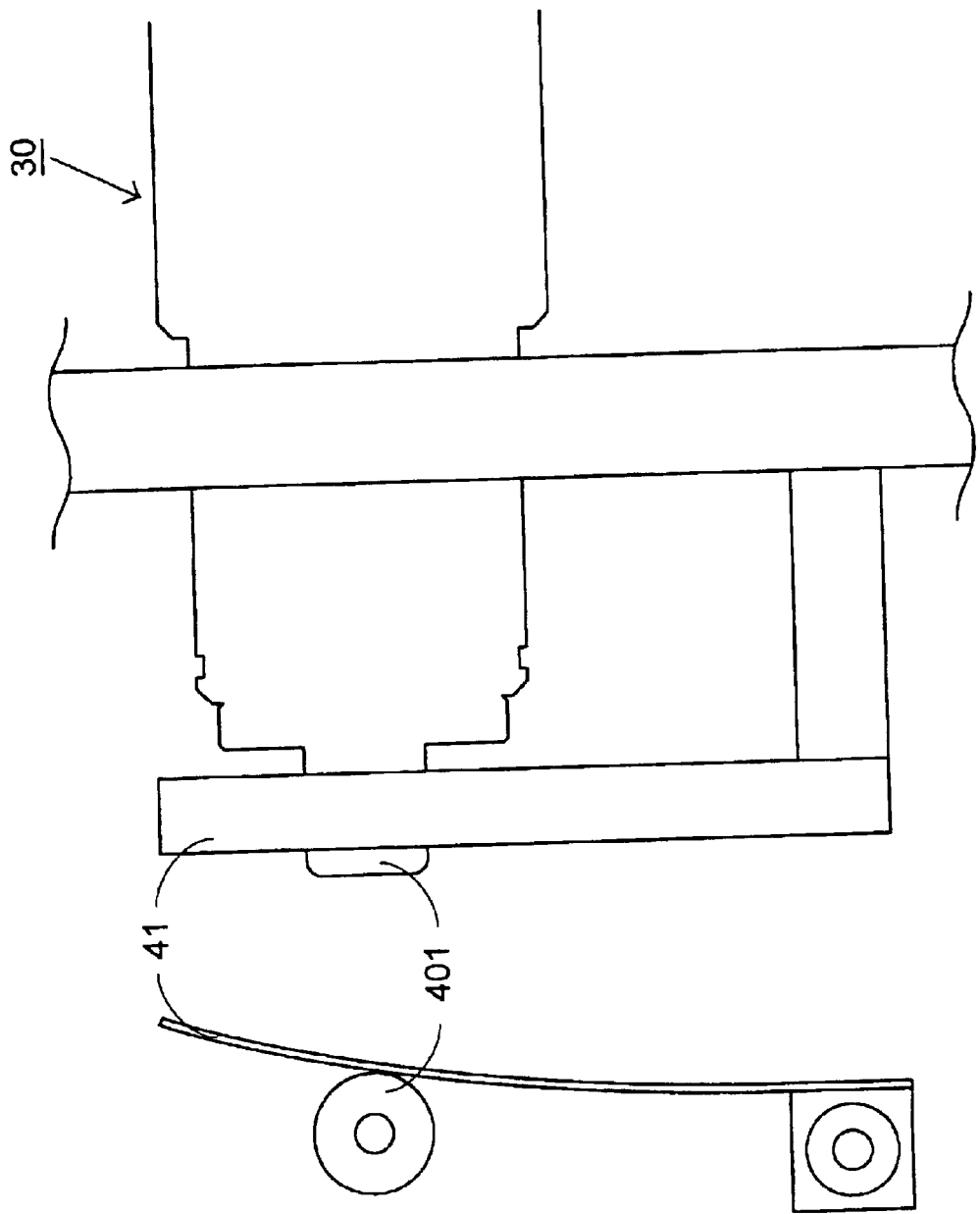
FIG. 2 is a cross-sectional view showing an electric contact enabling device for keeping electric contact of a rotating heater with a power transmission member according to prior art.

Please refer to FIG. 3. A laminating apparatus according to a preferred embodiment of the present invention principally comprises two electro-heating shafts 51 and two rollers 52 wrapping therein the two electro-heating shafts 51, respectively. A passage 50 is formed between these two rollers 52. In response to rotation of the rollers 52, a sheet material and a pair of thin films (not shown) can be moved forwards through the passage 50 so as to be heated and pressed by the rollers 52. The electro-heating shafts 51 transform electric energy into thermal energy for heating the thin films, and drive rotation of the rollers 52 to move through the thin films.

In order to reduce abrasion upon the rotation of the shafts 51, the laminating apparatus of the present invention further comprises a power transmitting and securing member, and a power transmitting and resilient member. For each shaft 51, the power transmitting and resilient member comprises a metallic spring 53; and the power transmitting and securing member is coupled to the shaft 51 and comprises a shaft sheath 54, a clipping element 55 and a conductive liner 56.

Figure 4D:
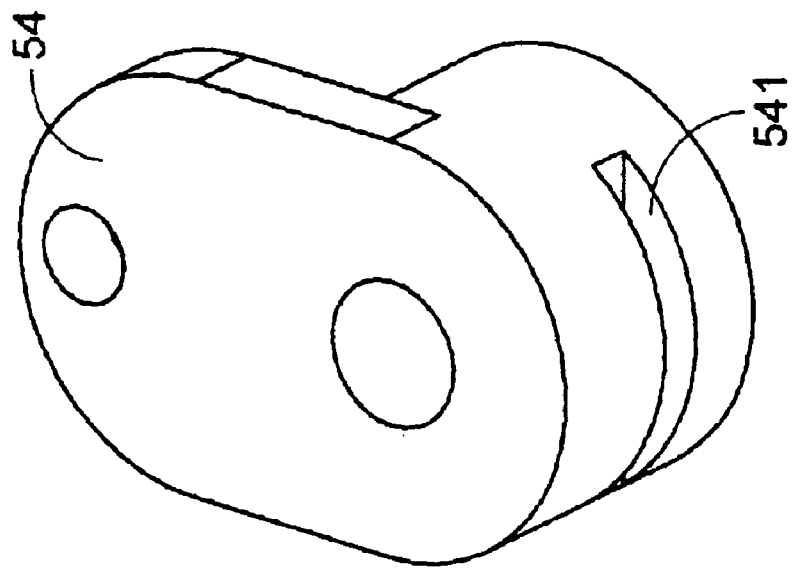
FIGS. 4(c) and 4(d) show a cross-sectional and a perspective views of the shaft sheath in FIG. 3, respectively.
Figure 4C:
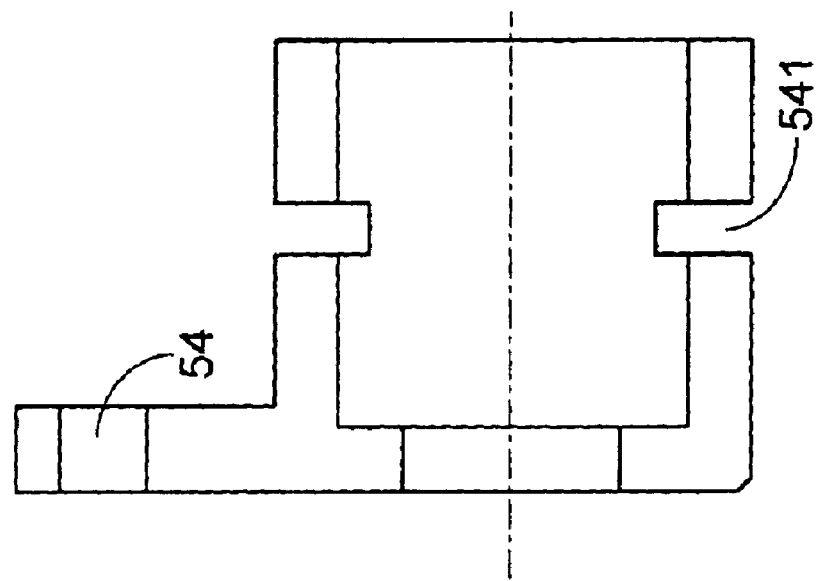
Figure 4E:
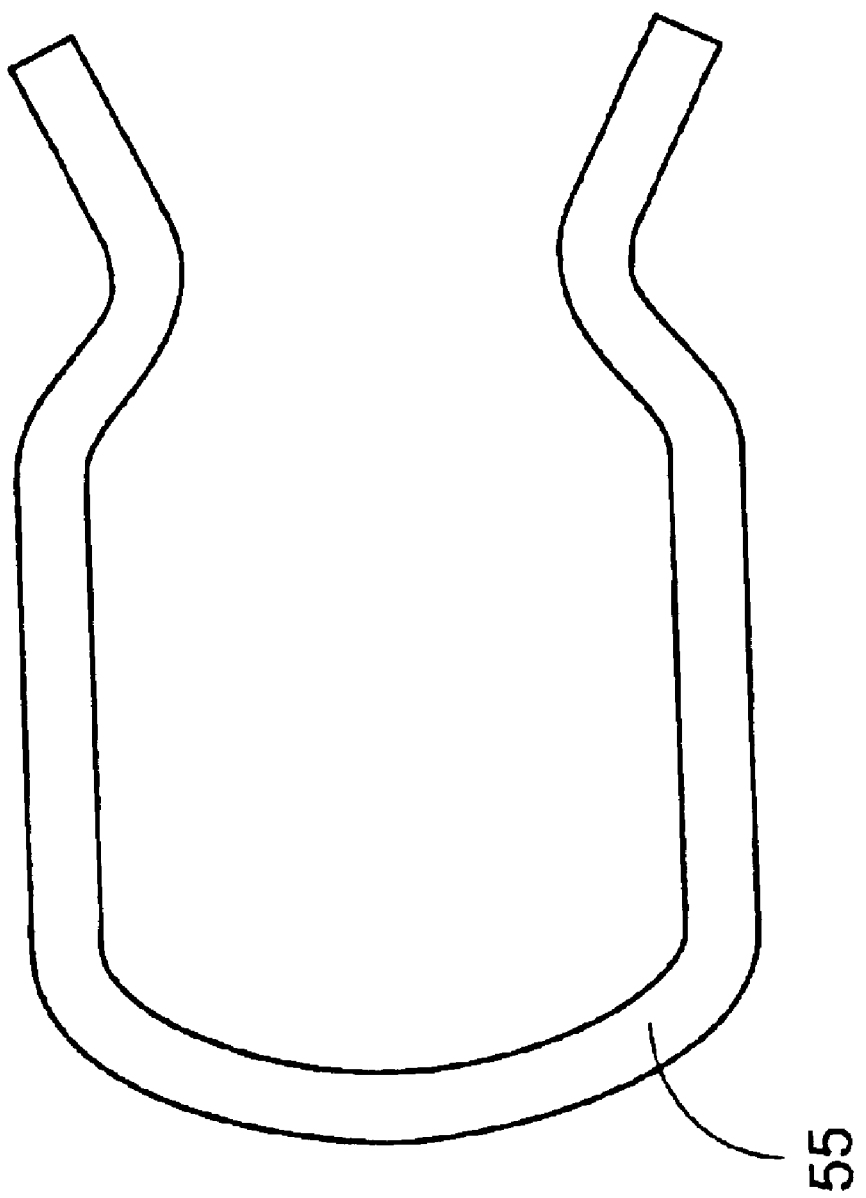
FIG. 4(e) is a cross-sectional view of the clipping element in FIG. 3.
Figure 4F:
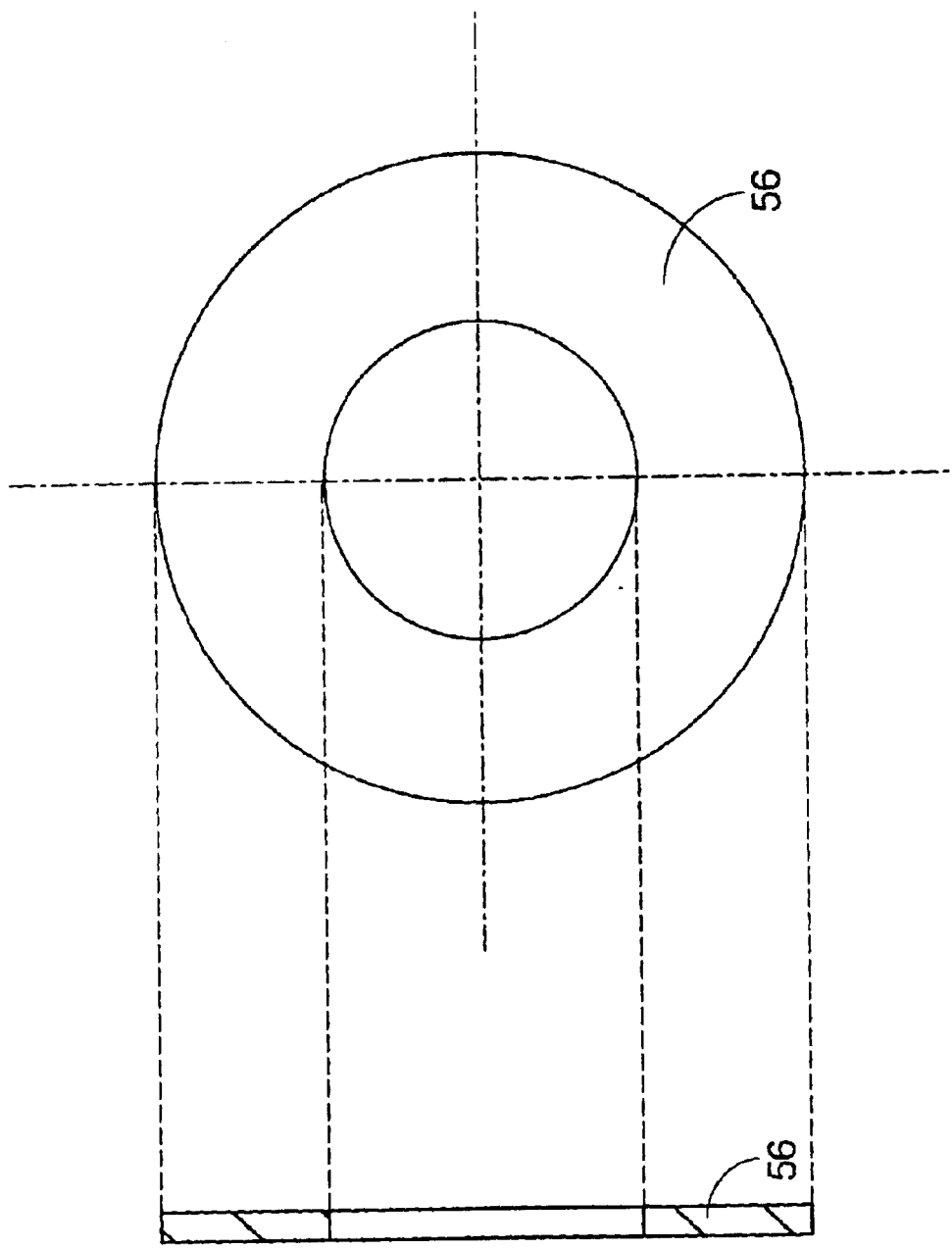
FIG. 4(f) shows a side and a top-plane views of the conductive liner in FIG. 3.

Please refer to FIGS. 3 and 4(a)~4(f). Each shaft sheath 54 is in electric connection with a power source PS via a conductive wire 60 and covers an axial end surface of the shaft 51. For a purpose of securing the shaft sheath 54, the shaft 51 has a recess 511 on a circumferential surface thereof, and the shaft sheath 54 has a slit 541 aligned with the recess 511 of the shaft 51. The clipping element 55 penetrates through the slit 541 of the shaft sheath 54 to engage with the shaft 51 at the recess 511 so as to compress and continuously urge against the metallic spring 53 between the shaft sheath 54 and the axial end surface of the shaft 51. The conductive liner 56 interfaces between the shaft sheath 54 and the metallic spring 53 for protection from abrasion. In addition, a protective cover 57 is provided outside the shaft 51 and the shaft sheath 54 to give electric isolation from surroundings.

The conductive liner 56, the clipping element 55 and the metallic spring 53 are preferably made of stainless steel such as sus303, and the shaft sheath 54 is made of copper coated with nickel, thereby providing an enforced structure and preventing from abrasion. Alternatively, the metallic spring can be replaced with a conductive rubber so as to transmit power and impart a resilient property.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A laminating apparatus for laminating a sheet material between a pair of thin films, comprising:
    a first and a second rollers forming therebetween a passage, through which said sheet material and said thin films are transmitted to be heated and pressed by said first and second rollers;
    a first and a second electro-heating shafts wrapped by said first and said second rollers, respectively, transforming electric energy into thermal energy transferred to said first and said second rollers to heat said thin films, and driving rotation of said first and a second rollers to move through said thin films;
    a first and a second shaft sheaths covering said axial end surfaces of said first and said second electro-heating shafts and in electric connected with said first and said second electro-heating shafts, respectively;
    a first and a second power transmitting and resilient members in contact with axial end surfaces of said first and said second electro-heating shafts in an axial direction of said first and said second electro-heating shafts for transmitting electricity from a power source to said first and said second electro-heating shafts, respectively; and
    a first and a second conductive liners interfacing between said first and second electro-heating shafts and axial end surfaces of said first and said second power transmitting and resilient members, respectively.

2. The laminating apparatus according to claim 1 wherein each of said first and said second conductive liners is made of stainless steel, and each of said first and said second shaft sheaths is made of copper coated with nickel.

3. The laminating apparatus according to claim 1 wherein each of said first and said second power transmitting and resilient members is a metallic spring.

4. The laminating apparatus according to claim 1 wherein each of said first and said second power transmitting and resilient members is a conductive rubber.

* * * * *